United States Patent [19]

Johanson et al.

[11] 4,365,300

[45] Dec. 21, 1982

[54] METHOD AND APPARATUS FOR VECTOR MACHINE CONTROL

[75] Inventors: Lars Johanson, Cedar Grove; Phil Haft, Fairlawn; Frank Bonavita, Carlstadt; George Feldstein, Cresskill; Steve Greenberg, Oradell, all of N.J.; Kevin Brady, Pearl River, N.Y.

[73] Assignee: Eltee Pulsitron, West Caldwell, N.J.

[21] Appl. No.: 182,592

[22] Filed: Aug. 29, 1980

[51] Int. Cl.³ .......................... G06F 15/46; B23P 1/08
[52] U.S. Cl. ................................. 364/474; 219/69 C; 219/69 G; 219/69 M; 364/131
[58] Field of Search ............... 364/101, 102, 474, 475, 364/477, 131-136; 219/69 M, 69 C, 69 G, 69 V, 69 W

[56] References Cited

U.S. PATENT DOCUMENTS

| | | | |
|---|---|---|---|
| 4,057,703 | 11/1977 | Pfau | 364/474 X |
| 4,071,729 | 1/1978 | Bell, Jr. | 219/69 C |
| 4,078,163 | 3/1978 | Bell, Jr. et al. | 364/474 X |
| 4,084,243 | 4/1978 | Kishi et al. | 364/474 |
| 4,135,070 | 1/1979 | Pfau et al. | |
| 4,150,275 | 4/1979 | Wavre | |
| 4,161,641 | 7/1979 | Bonga | |
| 4,168,426 | 9/1979 | Furukawa | |

Primary Examiner—Joseph F. Ruggiero

Attorney, Agent, or Firm—Fleit & Jacobson

[57] ABSTRACT

A method and apparatus for vector machine control of a tool and a workpiece so as to perform desired electric discharge machine (EDM) operations on the workpiece in accordance with a polar coordinate frame of reference. The method for vector machine control calls for the processing of input data to derive vector magnitude data, vector angle data and Z-axis data. The tool is advanced in the direction of the Z-axis by a given amount to an offset position, and the tool is then successively advanced and withdrawn in the direction of a given vector angle (corresponding to the vector angle data) by a corresponding distance (corresponding to the vector magnitude data). The procedure may be repeated for successive vector angles and magnitudes, and may be further repeated at other offset positions in accordance with other vector angle and vector magnitude data. In the apparatus for vector machine control, the aforementioned operations are precisely controlled by a multi-processor system equipped with operator input capability, position and gap detection circuitry, and display circuitry. The gap detection circuitry is specially constructed to provide a normal servo control output (for continuous and gradual control of EDM), as well an immediate servo retrack signal (for immediate cutoff of EDM in the event of occurrence of a seriously improper gap condition).

17 Claims, 8 Drawing Figures

METHOD AND APPARATUS FOR VECTOR MACHINE CONTROL

BACKGROUND OF THE INVENTION

1. Field of the Invention

The present invention relates to a method and apparatus for vector machine control. More specifically, the invention relates to a method and apparatus for vector machine control employing a new technique of machine tool control in performing electrical discharge machining (EDM).

2. Description of the Prior Art

In the past, machining has been accomplished by an operator who empirically moves a workpiece-carrying work-table transversely of an electrode. In such a conventional approach, machining largely depends upon the operator's dexterity, and such a technique is unfit for achieving high precision machining. Another defect of the conventional approach is that it is not efficient for providing complicated work patterns, or at least does not achieve same in an efficient manner.

As electrical technology has become more sophisticated, arrangements have been developed wherein the paths of the electrode have been controlled by means of electrical control circuitry coupled with servo motor control. Moreover, mechanical and analog signal processing techniques have, for some time, been employed in controlling EDM arrangements. However, such techniques have been relatively simplistic, and as a result, machining has been carried out in a rather unsophisticated, imprecise and inefficient manner. More specifically, EDM control techniques have been such that only relatively simple types of machining patterns have been able to be carried out. Thus, it has been impossible or at least difficult to achieve sophisticated types of machining patterns.

SUMMARY OF THE INVENTION

The present invention relates to a method and apparatus for vector machine control, and more specifically to a method and apparatus capable of performing more sophisticated machining patterns in a rapid and more efficient manner. Moreover, the method and apparatus of the present invention are characterized by various features which provide the operator with the capability of performing relatively complex EDM procedures in an efficient and precise manner, while also providing substantial operator-system interface so as to keep the operator well apprised of the status and functioning of the EDM control system.

The present invention introduces a new concept of machine tool control as applied to the field of EDM, which concept refers the relative movement of the tool and the workpiece to a polar coordinate plane. This is in contrast to prior techniques which have been limited to displacement in an orthogonal (or Cartesian) coordinate plane, and which thus have not been capable of carrying out sophisticated types of machining. Thus, the present invention carries out EDM relative to a polar coordinate plane, that is, in accordance with a designation vector having a magnitude r and a direction $\phi$ for each and every designated Z plane.

As will be described in more detail below, the present invention employs a manual data interface for providing operator-system interface so that the operator can easily and quickly enter parameters associated with the particular type of EDM to be carried out. Moreover, operator inputs are immediately provided, via a display processor, to a display unit so as to provide a verification capability.

The present invention also includes a gap detector and processor which constantly monitors the status of the tool and the workpiece, and provides appropriate data to an arithmetic processor, which in turn derives both display data and control data. The control data is provided, via a feedback loop, to a polar translator which controls the tool and workpiece, thus providing servo control thereof.

Finally, the positioning of the tool and the workpiece, in terms of the polar coordinates which define such positioning, is constantly monitored by a position detector interface, and the results of this monitoring operation are provided to the display processor, thus again keeping the operator completely informed as to the status of the tool and the workpiece.

It is to be noted that the vector machine controller of the present invention is a multi-processor system, wherein each processor is responsible for accomplishing respective functions. This results in a system which is more time-responsive, keeps the operator very well (and rapidly) informed, and is able to achieve the relatively more sophisticated types of EDM, especially in view of its operation in the polar coordinate plane.

Therefore, it is an object of the present invention to provide a method and apparatus for vector machine control, and more specifically a method and apparatus for vector machine control which refers the relative displacement of the tool and the workpiece to a polar coordinate plane.

It is an additional object of the present invention to provide a method and apparatus for vector machine control having a multi-microprocessor system, with responsibility for respective functions being divided between the processors.

It is an additional object of the present invention to provide a method and apparatus for vector machine control which incorporates state-of-the-art tandem microprocessor control and decision processing circuitry so as to convert a polar translator output to a controlled vector movement while providing parameter display.

It is an additional object of the present invention to provide a method and apparatus for vector machine control, wherein there is provided a vector machine controller specially configured so as to be capable of performing high-powered microprocessing, and which is thus capable of performing relatively more sophisticated EDM techniques in a rapid, precise and efficient manner.

It is an additional object of the present invention to provide a method and apparatus for vector machine control, wherein there is provided a vector machine controller having a sophisticated operator-system interface which provides not only rapid manual data input, but also highly responsive input and status data display.

The above and other objects that will hereinafter appear, and the nature of the invention, will be more clearly understood by reference to the following description, the appended claims, and the accompanying drawings.

DETAILED DESCRIPTION

The vector machine controller of the present invention will now be described in more detail with reference to the figures of the drawings.

Figure 1A:
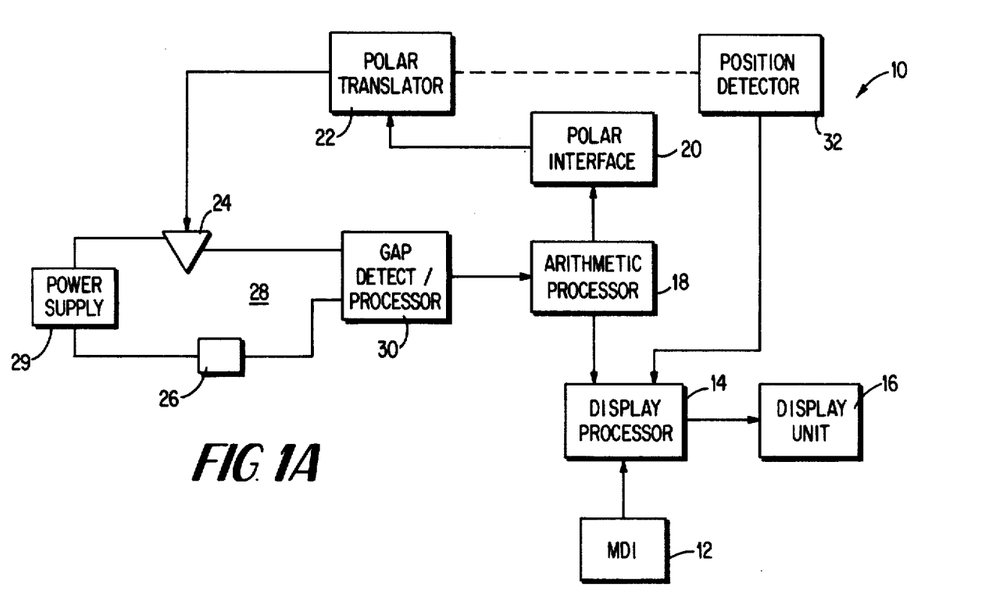
FIG. 1A is a general block diagram of the vector machine controller of the present invention.

FIG. 1A is a general block diagram of the vector machine controller of the present invention. As seen therein, the vector machine controller 10 comprises a manual data interface (MDI) 12, a display processor 14, associated display unit 16, an arithmetic processor 18, a polar interface 20, and a polar translator 22 connected to a tool 24, the tool 24 being positioned with respect a workpiece 26 so as to define a gap 28 therebetween. The tool 24 and workpiece 26 are, of course, connected to a conventional power supply 29 which provides the power for EDM. The vector machine controller 10 further comprises a gap detector/processor 30 associated with the tool 24 and workpiece 26, and connected to the arithmetic processor 18, as well as position detector interface 32 associated with the polar translator 22, and connected to the display processor 14.

In operation, the operator of the vector machine controller 10 enters data through the MDI 12, such data being provided to the display processor 14. Such data is also provided to the display unit 16, which displays the data input for verification by the operator. In addition, display processor 14 computes the vector for display, and displays same on the display unit 16 (in actuality, a cathode ray oscilloscope associated therewith). Furthermore, the display processor 14 performs other computations so as to issue Z control commands (digital signals for Z-axis control, which digital signals are subsequently converted into analog Z control signals).

Vector machine controller 10 also includes an arithmetic processor 18 which performs necessary computations and data processing in order to control machining operations. The arithmetic processor 18 functions, via the polar interface 20 and polar translator 22, to control the machining operations by advancing and adjusting the tool 24 relative to the workpiece 26. Of course, movement of the workpiece 26 relative to the tool 24 is encompassed within the latter sentence.

The status of the tool 24 and workpiece 26 (as well as the gap 28 therebetween) is monitored by the gap detector/processor 30, and the latter provides gap detection data to the arithmetic processor 18.

The vector machine controller 10 initiates and controls movement of the physical polar translator 22 so that movement in accordance with desired parameters (with respect to the tool 24 and workpiece 26) is achieved. Moreover, the vector machine controller is so configured that the tool 24 is controlled continuously by the arithmetic processor 18, so that both planar axes are controlled simultaneously. This is a requirement of a real-time process which requires precision control.

The display processor 14 includes, as will be seen below, all the mathematical routines, manual data inputs and Z control data needed by it, since such data is stored in an associated read-only memory (ROM).

Figure 1B:
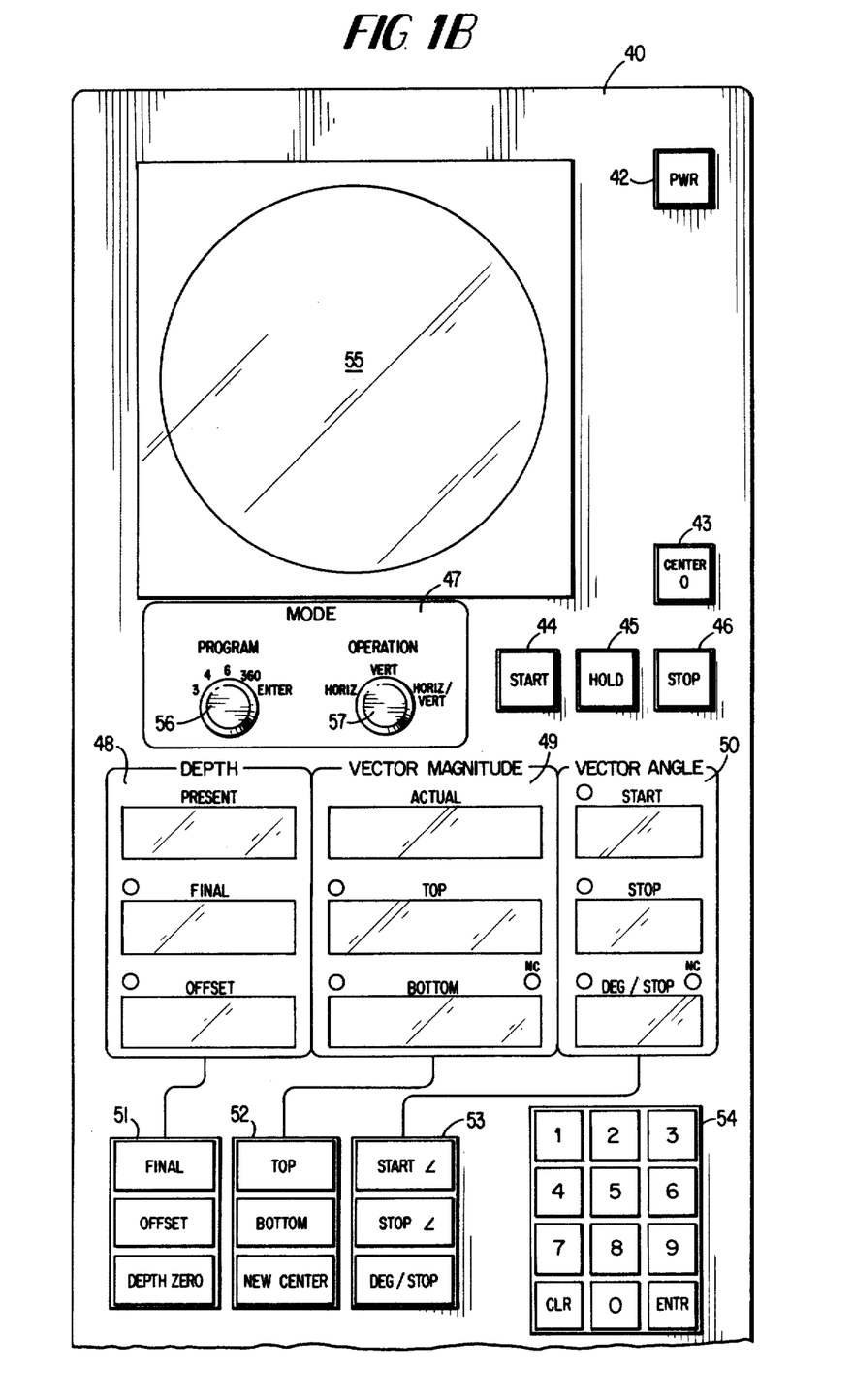
FIG. 1B is a representation of the control panel of the vector machine controller.

FIG. 1B is a representation of the control console of the vector machine controller. As seen therein, the control console 40 comprises a power switch 42, center switch 43, start switch 44, hold switch 45, stop switch 46, mode control section 47, depth display section 48, vector magnitude display section 49, vector angle display section 50, depth data input control switches 51, vector magnitude data input control switches 52, vector angle data input control switches 53, a conventional numeric keyboard 54, and a display device (CRO) 55.

In operation, the control console is activated by pressing the power switch 42. Data relative to depth may be entered by actuating, in succession, the various depth data input control switches 51, followed by numerical entries on the keyboard 54. Thus, the operator enters a final depth to which the machining tool 24 is to travel in the workpiece 26 by depressing the "final" switch in the depth data input control switch section 51, followed by entry of numerical data and depressing of the "enter" switch in the keyboard section 54. The depth off-set (depth at which a first vector is to be encountered by the tool 24 as it moves in the Z direction) is entered by the operator by utilization of the "off-set" switch in depth data input control switch section 51 in a similar manner.

In the same manner, the operator utilizes the "top", "bottom" and "new center" switches in the vector magnitude data input control switch section 52 to enter the top, bottom and new center data into the system. Similarly, the vector angle data input control switch section 53 is utilized to enter data relative to the starting angle, the stopping angle, and degrees in a step (angular increments of the tool 24).

The depth display indicator section 48 provides the operator with a display of the "present depth" (that is, the depth at which the tool is presently located), the "final depth" (that is, the destination depth of the tool), and the "offset depth" (that is, the depth at which a first vector is to be encountered).

The vector magnitude display indicator section 49 provides the operator with a display of the "actual vector magnitude" (that is, the vector magnitude presently being implemented), the "top vector magnitude" (that is, the vector magnitude at the start or top of the orbital movement), and the "bottom vector magnitude" (that is, the destination vector magnitude).

Finally, the vector angle indicator section 50 provides the operator with a display of the "start vector angle" (that is, the vector angle at the start of movement), the "stop vector angle" (that is, the vector angle at the cessation of movement), and the "degree/step of vector angle" (that is, the number of degrees in each increment of the vector angle as the tool performs its procedure).

The start switch 44 is utilized to actuate the microprocessors within the vector machine controller. The "hold" switch 45 is utilized to effect a pause in the operation of the vector machining. The "stop" switch 46 is actuated to stop processing by the microprocessors.

The "center" switch 43 is utilized to return the tool 24 to a center (or zero) position with respect to the machining process being performed.

The mode section 47 includes a "program switch" 56 which has various positions corresponding to the performance of various functions: the switch 56 is set to the "enter" position in order to enter magnitudes and depths (utilizing the data input control switches 51 and 52, respectively, as previously discussed); the "three", "four" and "six" positions of the switch 56 are utilized to actuate "canned" programs contained within the microprocessors so as to accomplish (for example) machining in accordance with square, circular or triangular patterns. The "360" position of switch 56 is utilized in order to obtain full machining (in 360°).

The mode section 47 also includes an operation switch 57, having various positions. The "horizontal" position of switch 57 is utilized in order to perform only vectoring (as opposed to vectoring and displacement with respect to the Z axis). The "vertical" position is utilized in order to perform only EDM processing without computer assistance, that is, in order to perform only machining or movement with respect to the Z axis. Finally, the "horizontal/vertical" position of switch 57 is used to achieve full operation of the system.

Figure 2:
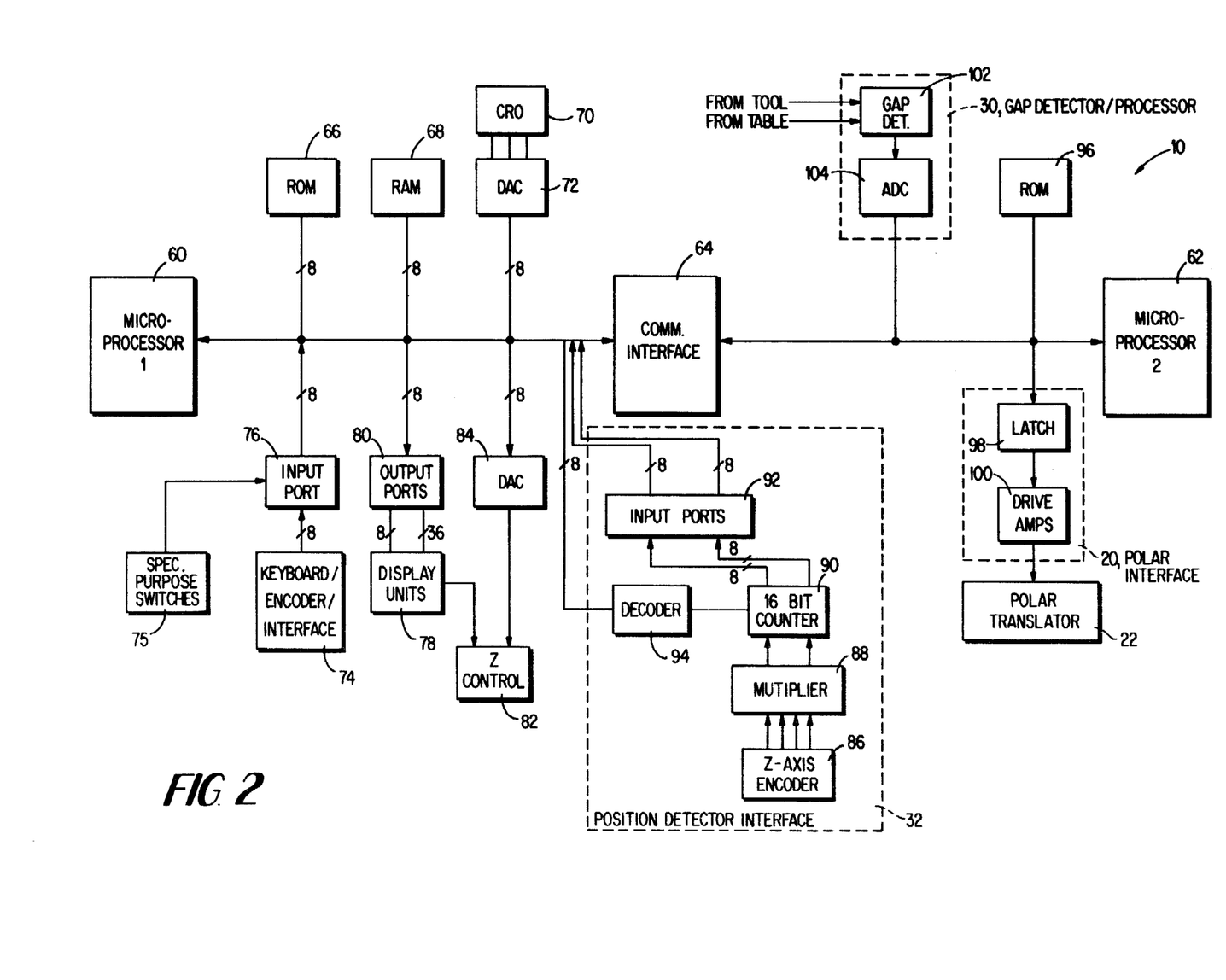
FIG. 2 is a more detailed block diagram of the vector machine controller of the present invention.

FIG. 2 is a more detailed block diagram of the vector machine controller 10. As seen therein, the vector machine controller 10 includes microprocessors 60 and 62 connected by a communications interface 64. Associated with the microprocessor 60 are a read-only memory (ROM) 66, a random access memory (RAM) 68, a cathode ray oscilloscope (CRO) 70 and associated digital-to-analog converter (DAC) 72, a keyboard/encoder/interface unit 74 and corresponding input port 76, display units 78 and a corresponding output port 80, a Z control unit 82 and associated DAC 84, and position detector interface 32 (comprising Z-axis counter 86, multiplier 88, sixteen-bit counter 90, and input ports 92 and decoder 94).

Associated with microprocessor 62 are a ROM 96, polar interface 20 (comprising latches 98 and drive amplifiers 100), polar translator 22, and gap detector/processor 30 (comprising gap detector 102 and ADC 104).

In operation, input data, as entered via the data input control switches 51 through 53 and keyboard 54 of the control console 40 of FIG. 1B (as previously described above) is provided to a keyboard/encoder/interface circuit 74. The keyboard/encoder/interface circuit 74 comprises conventional circuitry associated with keyboards for inputting data, and the details of the keyboard/encoder/interface 74 would be well known to those of skill in the art. Data provided to the keyboard/encoder/interface 74 is not only displayed on display units 78 (which correspond to the display indicators 48 through 50 of the control console 40 of FIG. 1B, and which are seven-segment LED-type displays), but is also provided, via input port 76, to the microprocessor 60. Microprocessor 60 is a conventional microprocessor (for example, a 6802-type microprocessor, manufactured by Motorola).

As previously mentioned, a ROM 66 is associated with the microprocessor 60. This ROM 66 contains the Z-control data and program necessary for performing various computations and procedures relating to conventional EDM control techniques relative to Z-control. Also associated with microprocessor 60 is RAM 68, which performs the function of a "scratch pad" memory.

Microprocessor 60 performs various functions with respect to this portion of the vector machine controller 10. Specifically, microprocessor 60 multiplexes all keyboard input data (provided by keyboard/encoder/interface 74 via input port 76), as well as all special-purpose switches 75 (the previously described switches of the control console 40 of FIG. 1B). In addition, microprocessor 60 performs a multiplexing operation with respect to the display unit 78 (connected to the microprocessor 60 via the output ports 80).

As previously indicated, microprocessor 60 provides output data, via the output ports 80, to the display unit 78. A Z control command is provided, in eight-bit digital form, from the microprocessor 60 to the DAC 84, wherein it is converted to analog form, and provided to the Z control unit 82.

Z control unit 82, as will be discussed in more detail below with respect to FIG. 3, performs various buffering and impedance matching functions so as to provide a Z control signal, that is, an analog Z control output which controls relative displacement along the Z-axis between the tool 24 and the workpiece 26 (FIG. 1A).

Position detector interface detects translation-type relative movement between the tool 24 and the workpiece 26, such translation movement being in the direction of the Z axis. This movement is encoded by the Z-axis encoder 86, and the digital output is provided, via a multipler 88 (which performs a conventional multiplication procedure), so as to derive a further digital output for provision to the sixteen-bit counter 90.

The sixteen-bit counter 90 is reset by microprocessor 60 via decoder 94. Specifically, upon actuation of the "depth zero" switch in the depth data input control switch section 51 of control console 40 (FIG. 1B), microprocessor 60 transmits an eight-bit word to the decoder 94. Decoder 94 decodes this eight-bit word, and upon detection of the fact that the "depth zero" switch has been depressed, resets the sixteen-bit counter 90, thus effectively establishing the zero depth of the tool 24 with respect to the workpiece 26.

Then, as relative displacement of the tool 24 and workpiece 26 in the Z direction takes place, the translation movement is detected by the Z-axis encoder 86, and this results in the generation of counting pulses by the multiplier 88, the frequency of the counting pulses being related to the rate of displacement, and thus the distance displaced, between the tool 24 and the workpiece 26. Therefore, the contents of the sixteen-bit counter 90 reflect the Z-axis positioning of the tool 24 relative to workpiece 26. Moreover, the contents of the counter 90 are provided, via input ports 92, to the microprocessor 60, wherein they are compared to the off-set input to determine the position of the tool 24 with respect to the Z axis, and the need for any Z-axis correction (the latter being effected via the Z control unit 82 previously discussed).

It is to be noted that the Z-axis encoder is a conventional encoding device for translating mechanical movement of the tool 24 into electrical signals. For example, the Z-axis encoder 86 may be a Glass Scale, Model No. LS903, manufactured by Heidenhain Corporation. Similarly, the multiplier 88 may be any conventional multiplier, for example, the X5 Multiplier, Model No. E-759-1C, also manufactured by Heidenhain Corporation.

Whereas the microprocessor 60 is basically responsible for the control of movement of the tool 24 in the Z direction (as well as various other functions described above), the microprocessor 62 is basically responsible for two functions: (1) gap detection and processing, and (2) movement of the tool 24 with respect to the polar coordinate system.

The gap detector/processor 30 comprises a gap detector circuit 102 which monitors and processes the cutting voltage from the machine tool to develop an analog signal (SERVO OUT) corresponding to needed movement of the tool 24 relative to the workpiece 26. The gap detector/processor 30 is provided with an ADC 104 for receiving the analog signal from gap detector 102, and converting same to an eight-bit digital word, the latter being provided via communication interface 64 to the microprocessor 60.

Microprocessor 62 performs the various computations necessary in order to effect polar translation (that is, movement with respect to the polar coordinate system) of the tool 24 relative to the workpiece 26. As a result of its computations, the microprocessor 62 compiles data necessary for polar translation. This data is, upon command by the microprocessor 62, latched by latch circuits 98. The data thus latched is subsequently provided to drive amplifiers 100, which translate the low-level input to high-current signals for provision to a stepping motor (a conventional motor) contained in the polar translator 22.

The polar translator 22 is a readily available, off-the-shelf piece of hardware for displacing the tool 24 with respect to the workpiece 26. For example, the polar translator 22 may be a Stepping Motor, Model No. KP-6AM2, manufactured by Japan Servo Company. It converts the electrical signal (high current signal) provided by the drive amplifiers 100 into mechanical movement, thus effecting polar movement or translation of the tool 24 relative to workpiece 26.

It is to be noted that the eight-bit data input from the microprocessor 62 to the latches 98 is also provided, via the communication interface 64, to the microprocessor 60. This provides the microprocessor 60 with an indication of the actual vector magnitude, so that the microprocessor 60 is able to perform its function of rendering to the operator an indication of actual vector magnitude, such being indicated on the "actual vector magnitude" LED display indicator contained in vector magnitude display section 49 of the control console 40 (FIG. 1B).

Figure 3:
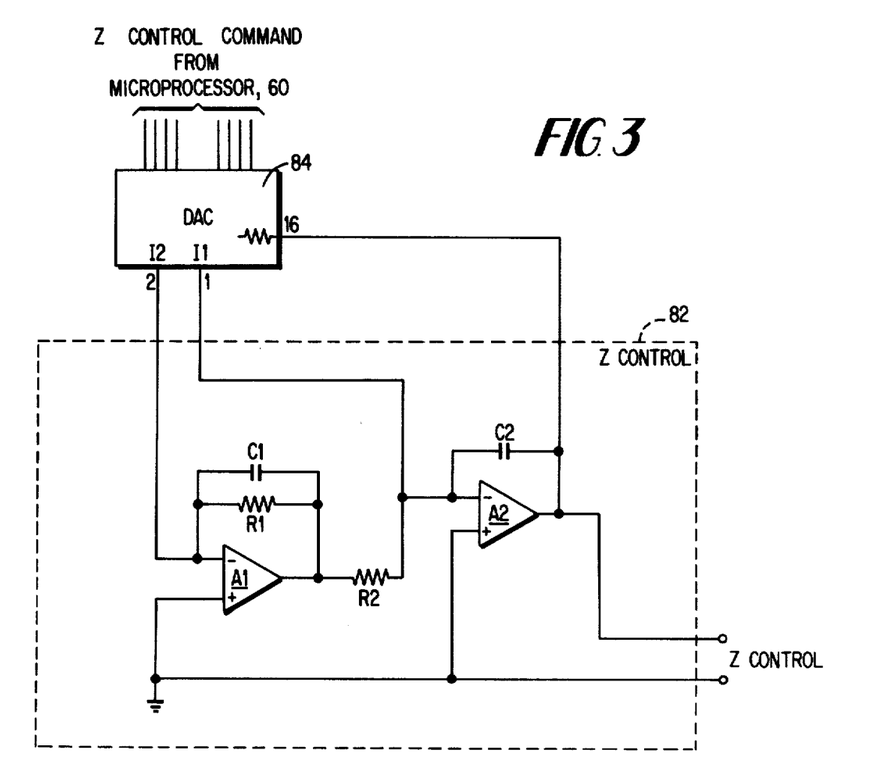
FIG. 3 is a more detailed block diagram of the Z control unit of FIG. 2.

FIG. 3 is a more detailed block diagram of the Z control unit of FIG. 2. As seen therein, the Z control unit 82 is connected to the DAC 84, the latter receiving an eight-bit digital input (Z control data input) from microprocessor 60. Z control circuit 82 comprises cascade-connected amplifiers A1 and A2, with associated resistors and capacitors R1, R2, C1 and C2, respectively.

In operation, the DAC 84 converts the eight-bit digital input (Z control command) to a corresponding analog output (in a conventional manner), and the analog output is provided to the Z control circuit 82 as shown in FIG. 3. The amplifiers A1 and A2, and associated elements, of Z control circuit 82 perform buffering and Z-matching of the analog input, so as to produce the Z control signal for provision to the conventional depth control circuitry (not shown) of the workpiece 24.

FIGS. 4A through 4D are detailed circuit diagrams of the gap detector of FIG. 2.

Figure 4A:
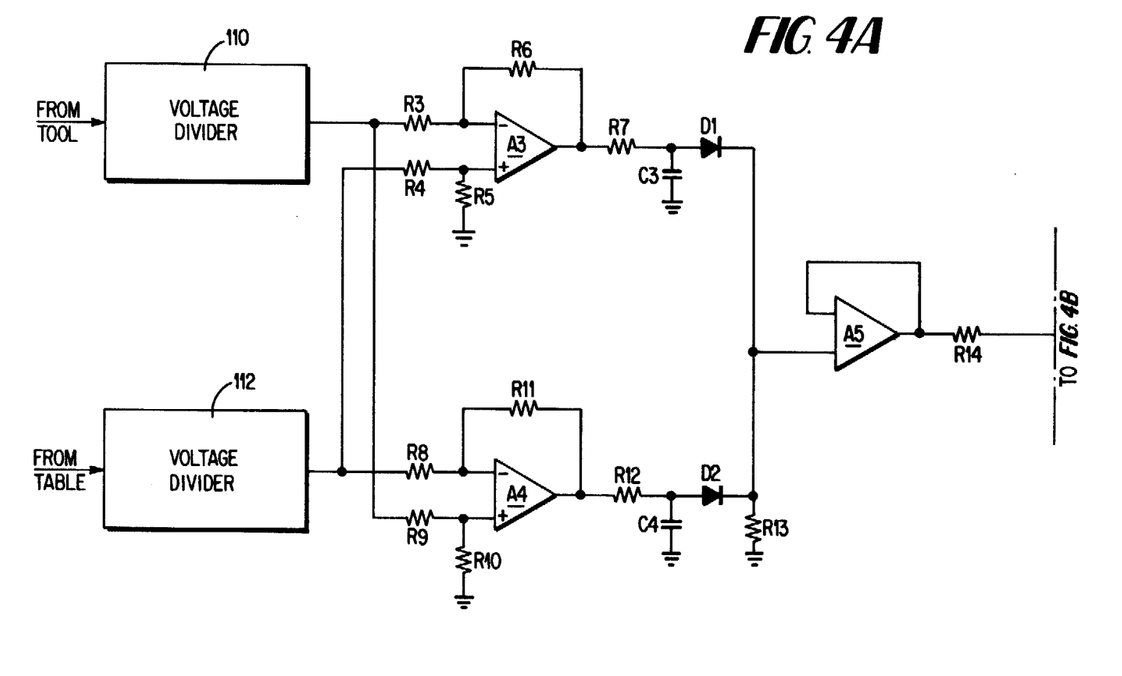
FIGS. 4A, 4B, 4C and 4D are detailed circuit diagrams of the gap detector of FIG. 2.

As seen in FIG. 4A, the gap detector 102 of FIG. 2 comprises an initial stage consisting of an instrumentation amplifier arrangement. More specifically, the instrumentation amplifier arrangement includes amplifiers A3 through A5, with associated resistors R3 through R14 and capacitors C3 and C4, as well as diodes D1 and D2.

In operation, voltages from the tool and table, respectively, are subjected to voltage division in corresponding voltage divider networks 110 and 112, with the outputs of the voltage divider networks 110 and 112 being provided via input resistors R3, R4 and R8, R9 to differential amplifiers A3 and A4, respectively. The outputs of amplifiers A3 and A4 are provided via respective resistor-capacitor-diode combinations R7, C3, D1 and R12, C4, D2, in common, to one input of an amplifier A5. Diodes D1 and D2 are provided at the outputs of amplifiers A3 and A4 in order to provide automatic compensation for the polarity of the EDM machine (thus, making it possible to utilize either positive or negative polarity voltage for cutting).

Figure 4B:
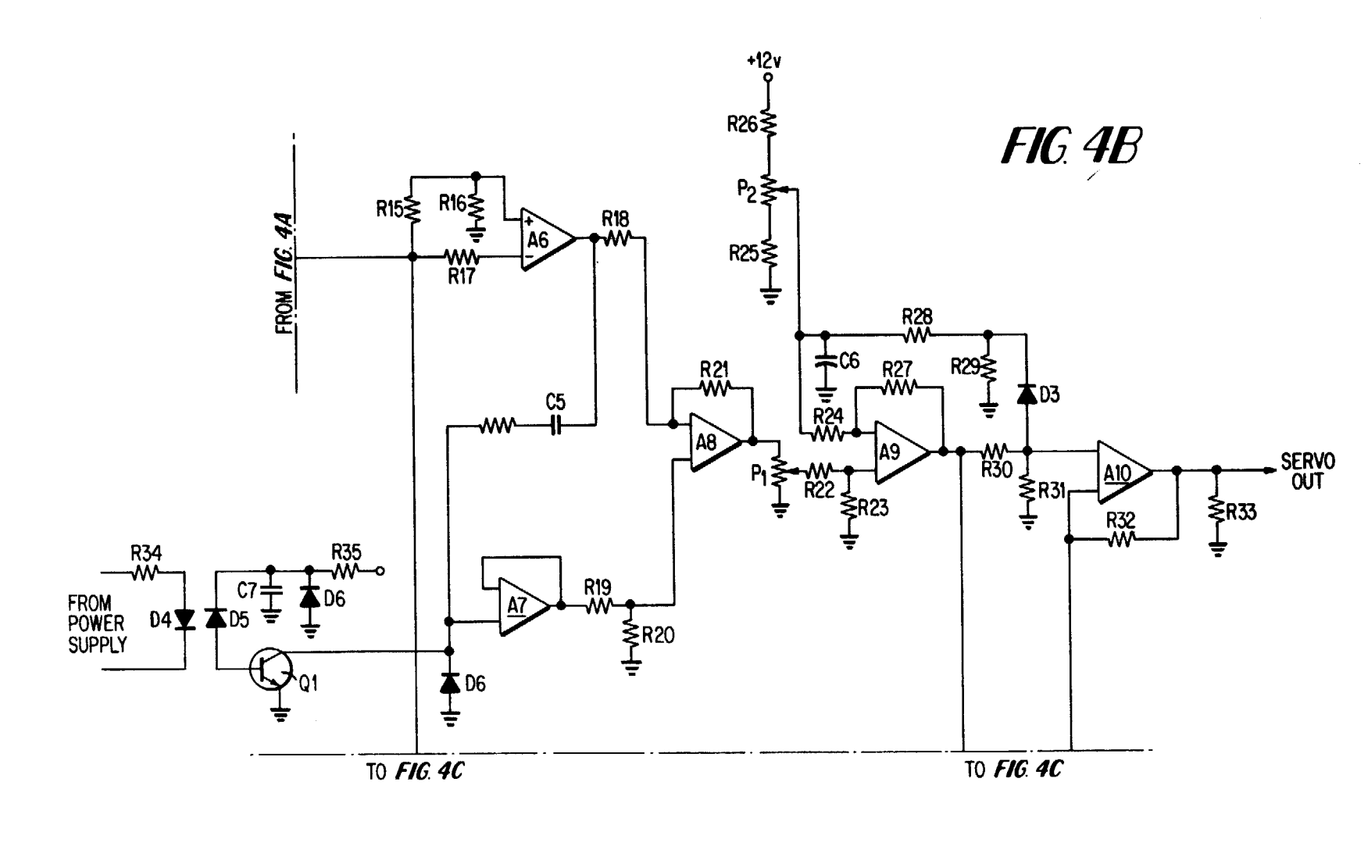
Figure 4C:
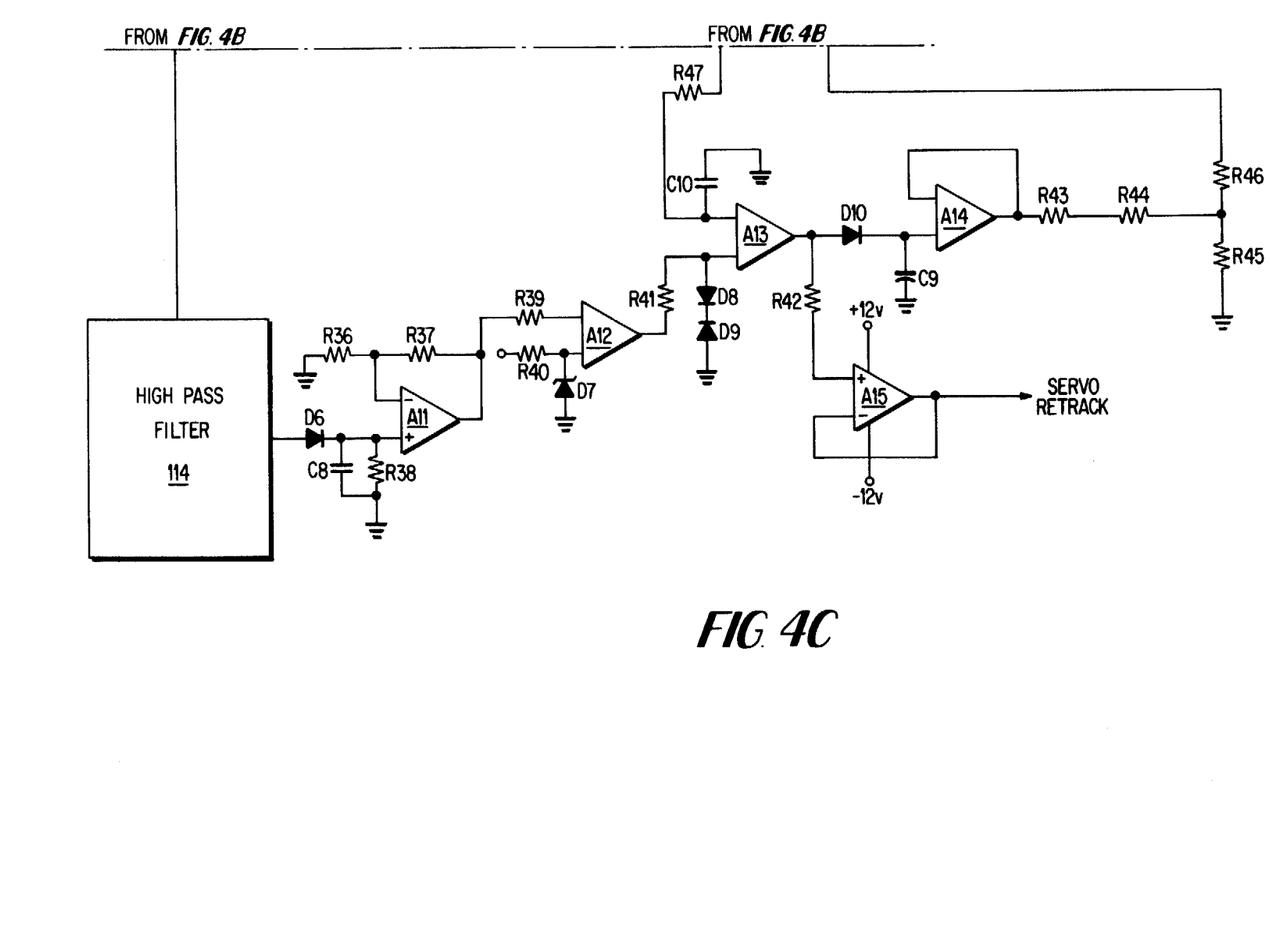

Amplifier A5 is connected in a voltage follower configuration, and performs an impedance-matching function so as to provide its output, via resistor R14, to two further signal paths in the gap detector circuit 102 (shown in FIGS. 4B and 4C, respectively).

FIG. 4B shows the first of the two signal paths of the gap detector 102 of FIG. 2, and is referred to below as path A of the gap detector 102. As seen in FIG. 4B, path A of the gap detector 102 includes amplifiers A6 through A10, and associated resistors R15 through R33, potentiometers P1 and P2, capacitors C5 and C6 and diode D3.

In operation, the output of amplifier A5 of FIG. 4A is provided, via resistors R15 and R17, to the inputs of differential amplifier A6, the latter with its associated resistors functioning as an isolation amplifier arrangement. The output of amplifier A6 is provided, via capacitor C5, to further amplifier A7. It is to be noted that the junction between capacitor C5 and the input of amplifier A7 is connected, via an optical isolation network (made up of diodes D4 and D5, in conjunction with transistor Q1, further diode D6, capacitor C7 and resistors R34 and R35), to the timer (not shown) of power supply 29 of FIG. 1A. Specifically, the timer (not shown) of power supply 29 supplies a stobe signal, via the optical isolation network, to the input of amplifier A7.

Since the strobe signal from power supply 29 is off when EDM cutting is not being performed, the capacitor C5 is charged by the output of amplifier A6. When cutting is being performed, the strobe signal is on, and capacitor C5 is discharged. It is to be noted that, in a preferred embodiment, the strobe signal from the timer (not shown) of the power supply 29 is provided via the optical isolation network (made up of diodes D4 and D5, and associated elements).

As a result of successive charging and discharging of the capacitor C5, however, the input of amplifier A7 contains noise. Therefore, amplifier A7 is arranged in a voltage-follower configuration, and functions to "clean up" the noise resulting from the successive charging and discharging of capacitor C5. The output of amplifier A7 is provided, via voltage-dividing resistors R19 and R20, to the inverting input of amplifier A8, the other input of which receives the output of amplifier A6 (via resistor R18).

Amplifier A8 performs a comparison operation of its inputs only during the "off time", that is, only during the time that the EDM system is not performing its cutting operation. This restriction of the function of amplifier A8, so as to perform its comparison operation only during "off time", results from the fact that the inverting input of amplifier A8 is connected, via the optical isolation network D4, D5 and the voltage-follower amplifier A7, to the strobe signal from the timer (not shown) of the power supply 29 of FIG. 1A.

The output of amplifier A8 is provided, via potentiometer P1 and voltage-divider R22, R23, to the input of amplifier A9, the other input of which receives an adjusted gap reference voltage (provided by potentiometer P2). Potentiometers P1 and P2 are operator adjustable in accordance with the particular gap reference voltage.

Amplifier A9 adds or subtracts the gap reference voltage from the output of amplifier A8 (provided via potentiometer P1 and voltage-divider R22, R23) in order to null out the gap when a cutting operation is being performed. The output signal from amplifier A9 is provided to a further signal path of the gap detector circuitry, as seen in FIG. 4C and as discussed below.

Figure 4D:
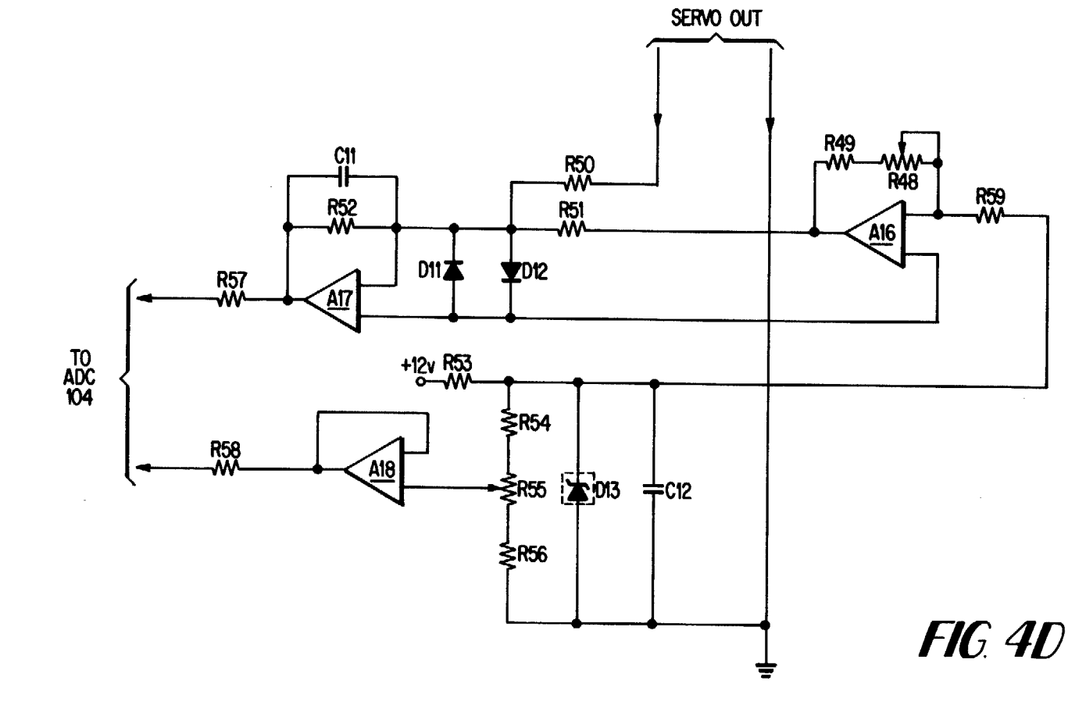

The output of amplifier A9 is also provided, via a voltage-divider R30, R31, to the non-inverting input of amplifier A10 (a unity gain amplifier), the inverting input of which is connected to the further path of the gap detector (as seen in FIG. 4C). As a result of its operation, amplifier A10 provides an output voltage SERVO OUT, the latter being provided to a further portion of the gap detector circuitry, as seen in FIG. 4D and as discussed below.

As seen in FIG. 4C, a second signal path in the gap detector circuitry comprises a high pass filter 114, amplifiers A11 through A15, diodes D6 through D10, resistors R36 through R47 and capacitors C8 and C9.

In operation, the output of voltage-follower amplifier A5 of FIG. 4A is provided to high pass filter 114 which detects noise in the amplifier output when cutting is being performed. The filtered output of high pass filter 114 is demodulated by a demodulating diode D6, and is provided to the non-inverting input of amplifier A11. The output of amplifier A11 (which, preferably, has a gain of approximately 10) is provided, via resistor R39 to amplifier A12, the other input of which is connected to a positive reference voltage via resistor R40. Amplifier A12 is a comparator amplifier which compares the output of amplifier A11 (as received via resistor R39) to a 5.1 volt reference voltage. This comparison operation determines whether or not the EDM cutting operation is progressing satisfactorily. That is, when the signal from amplifier A11 is greater than 5.1 volts, amplifier A12 produces a zero output, thus indicating the absence of an alarm condition (that is, thus indicating that cutting may proceed). Conversely, when amplifier A12 detects that the output of amplifier A11 is less than 5.1 volts, amplifier A12 produces a positive output, indicating that an alarm condition does exist, and that cutting should cease.

The output of amplifier A12 is provided, via resistor R41, to the input of A13, a summing amplifier, the other input of which is connected (via resistor R47) to the output of amplifier A9 of FIG. 4B. Thus, summing amplifier A13 performs a summing operation with respect to the processed signal from path A, on the one hand, and the alarm condition output of comparator amplifier A12 in path B, on the other hand. In this manner, amplifier A13 detects (via the output of amplifier A12) the presence of an alarm condition, and produces a corresponding output signal which (as will be seen below) serves to reduce the signal level of the processed signal resulting from path A. However, it should be noted that the output of amplifier A13 is provided, via resistor R42, to a further amplifier A15, the output of which constitutes an immediate "servo retrack" signal, indicating that an immediate cessation of cutting should be effected.

Returning to amplifier A13, the output thereof is provided to amplifier A14 (connected in a voltage-follower configuration), and the output of amplifier A14 is provided via resistors R43, R44 and voltage-divider R45, R46, to the inverting input of unity gain amplifier A10 in path A (FIG. 4). As a result of the differential amplification operation performed by unity gain amplifier A10, the signal from path B (FIG. 4C) is subtracted from the processed signal of path A (FIG. 4B), with the result that, if an alarm condition is indicated in path B, the output SERVO OUT is reduced to a level so as to retard forward advance of the tool 24 with respect to the workpiece 26 (FIG. 1A). That is to say, as long as an alarm condition is not indicated in path B, the output SERVO OUT of path A will continue to cause forward advance of the tool 24; conversely, once an alarm condition is indicated in path B, SERVO OUT is modified so as to retard further forward advance of the tool 24. It will be recalled that occurrence of an alarm condition in path B results in the generation of signal SERVO RETRACK (the output of amplifier A15), and this results in an immediate "servo retrack" or cessation of cutting by the tool 24.

FIG. 4D shows a further portion of the gap detector circuitry of FIG. 2. As seen therein, the further portion of the gap detection circuitry comprises amplifiers A16 through A18, associated resistors R48 through R58, associated diodes D11 through D13, and associated capacitors C11 and C12.

In operation, the output SERVO OUT of amplifier A10 of FIG. 4B is provided, via resistor-diode network R50, D11, D12 to amplifier A17. It is to be noted that the junction between resistor R50 and diodes D11, D12 is connected, via resistor R51, to the output of a further amplifier network made up of amplifier A16 and resistors R48, R49, R59. The inverting input of amplifier A60 is connected via resistors R53 to a +12 volt power supply, the junction between resistors R53 and R59 being connected to the input network of amplifier A18, the latter input network consisting of resistors R54 through R56, capacitor C12, and tunnel diode D13.

Amplifiers A17 and A13 function as dual comparators for the purpose of voltage level adjustment of input SERVO OUT. Specifically, a +3 volt level of SERVO OUT is converted to a +4 volt level at the output of dual comparators A17, A18, while a −2 volt level at the input is converted to a zero volt level at the output. The resulting voltage-adjusted output of dual comparators A17, A18 is provided to the ADC 104 of FIG. 2, wherein (as previously explained) conversion to digital form takes place, thus producing a digital gap detection output signal (of eight bits).

It is to be noted, with reference to FIG. 2, that the communications interface 64 is a conventional arrangement of buffers through which data is exchanged between the microprocessors 60 and 62, in accordance with a conventional "handshaking" technique. Such a technique is well-known in the art of digital processing and programming.

While preferred forms and arrangements have been shown in illustrating the invention, it is to be clearly understood that various changes in detail and arrangement may be made without departing from the spirit and scope of this disclosure.

What is claimed is:

1. An apparatus for vector machine control of a tool and a workpiece to perform desired electric discharge machine operations on said workpiece, said apparatus comprising:

operator means for providing input data relating to said desired electric discharge machine operations, said input data including desired vector magnitude data, desired vector angle data and desired Z-axis depth data;

first processor means for receiving and storing said input data, and for processing said input data to derive Z-axis control data for controlling movement of said tool in the direction of said Z-axis;

second processor means for receiving said input data stored by said first processor means, and for processing said input data so as to develop vector magnitude control data and vector angle control data for controlling movement of said tool in a direction corresponding to said vector angle through a distance corresponding to said vector magnitude;

position detector means for detecting a present depth position of said tool relative to said Z-axis, and for providing corresponding present depth position data to said first processor means; and     gap detector means for detecting a present gap between said tool and said workpiece, and for providing corresponding gap detection data to said second processor means;

said first processor means receiving said vector magnitude control data and said vector angle control data from said second processor means, and processing same to derive present vector magnitude data and present vector angle data;

said apparatus further comprising display means for receiving, from said first processor means, and for displaying said present depth position data, said present vector magnitude data and said present vector angle data for viewing by said operator.

2. The apparatus of claim 1, further comprising polar translator means responsive to said vector magnitude control data and said vector angle control data from said second processor means for relatively displacing said tool and said workpiece in accordance therewith.

3. The apparatus of claim 1, further comprising Z-axis control means responsive to said Z-axis control data from said first processor means for relatively displacing said tool and said workpiece in accordance therewith.

4. The apparatus of claim 1, wherein said gap detector means comprises first means for measuring a gap voltage between said tool and said workpiece to develop a gap voltage signal, second means responsive to said gap voltage signal for deriving a forward advance signal corresponding to needed forward advance of said tool relative to said workpiece, third means responsive to said gap voltage signal for deriving an advance control signal, and subtracting means for subtracting said advance control signal from said forward advance signal to derive an analog servo control signal.

5. The apparatus of claim 4, said gap detector means further comprising digitizing means for receiving and digitizing said analog servo control signal so as to develop said corresponding gap detector data provided to said second processor means.

6. The apparatus of claim 4, wherein said third means processes said gap voltage signal in accordance with predetermined voltage criterion to determine the existence of an improper gap condition, and responsive to said improper gap condition by issuing a servo retrack signal for immediate cut off of electric discharge machining.

7. In an apparatus for vector machine control of a tool and a workpiece to perform desired electric discharge machine operations on said workpiece, said apparatus comprising:

first processor means for receiving and storing input data relating to said desired electric discharge machine operations, and for processing said input data to derive Z-axis control data for controlling movement of said tool in a direction parallel to said Z-axis, and     second processor means for receiving said input data stored by said first processor means, and for processing said input data so as to develop vector magnitude control data and vector angle control data for controlling movement of said tool in a direction corresponding to said vector angle through a distance corresponding to said vector magnitude; and     gap detector means for detecting a present gap between said tool and said workpiece, and for providing corresponding gap detector data to said second processor means;

wherein said gap detector means comprises first means for measuring a gap voltage between said tool and said workpiece to develop a gap voltage signal, second means responsive to said gap voltage signal for deriving a forward advance signal corresponding to needed forward advance of said tool relative to said workpiece, third means responsive to said gap voltage signal for deriving an advance control signal, and subtracting means for subtracting said advance control signal from said forward advance signal to derive an analog servo control signal.

8. In the apparatus of claim 7, said gap detector means further comprising digitizing means for receiving and digitizing said analog servo control signal so as to develop said corresponding gap detector data provided to said second processor means.

9. In the apparatus of claim 7, wherein said third means processes said gap voltage signal in accordance with predetermined voltage criterion to determine the existence of an improper gap condition, and is responsive to said improper gap condition for issuing a servo retrack signal for immediate cut off of electric discharge machining.

10. In an apparatus for vector machine control of a tool and a workpiece to perform desired electric discharge machine operations on said workpiece, said apparatus comprising:

means for providing input data relating to said desired electric discharging machine operations, said input data including desired vector magnitude data and desired vector angle data,     processing means for processing said input data to derive vector magnitude control data and vector angle control data for controlling movement of said tool, and     polar translator means for advancing said tool, in the direction of said desired vector angle, through a distance equal to said desired vector magnitude, and for withdrawing said tool in a direction opposite to said desired vector angle by a distance equal to said desired vector magnitude;

the improvement wherein said polar translator means comprises a motor for effecting said advancing and withdrawing of said tool in accordance with a polar coordinate frame of reference, and said apparatus further comprises polar interface means responsive to said vector magnitude control data and said vector angle control data from said processing means for providing corresponding control signals to said motor, whereby said tool is advanced and withdrawn in accordance with said vector magnitude control data and said vector angle control data.

11. In the apparatus of claim 10, wherein said processing means further processes said input data to derive Z-axis control data, said apparatus further comprising Z-axis control means for advancing said tool in a direction parallel to said Z-axis in accordance with said Z-axis control data, whereby to position said tool with respect to said workpiece prior to operation of said advancing means and said withdrawing means.

12. In an electric discharge machine comprising a tool and a table capable of supporting a workpiece, said tool and said workpiece defining an axis having an axial direction, a power supply for supplying voltage across the tool and the workpiece to effect electric discharge machining, means for relatively displacing said tool and said workpiece in said axial direction, and means for relatively displacing said tool and said workpiece in a plane perpendicular to said axial direction, wherein said means for relatively displacing said tool and said workpiece in said plane perpendicular to said axial direction displaces said tool and said workpiece in accordance with desired vector magnitude data and desired vector angle data relating to a polar coordinate frame of reference, wherein said means for relatively displacing said tool and said workpiece in an axial direction displaces said tool and said workpiece to a first offset position, and said means for relatively displacing said tool and said workpiece in a plane perpendicular to said axial direction relatively displaces said tool and said workpiece in accordance with first desired vector magnitude data and first desired vector angle data, and wherein said means for relatively displacing said tool and said workpiece in an axial direction displaces said tool and said workpiece to a second offset position, and said means for relatively displacing said tool and said workpiece in a plane perpendicular to said axial direction relatively displaces said tool and said workpiece in accordance with second desired vector magnitude data and second desired vector angle data, 13. A method for electric discharge machining utilizing a tool and a table capable of supporting a workpiece, said tool and said workpiece defining an axis having an axial direction, comprising the steps of:
relatively displacing said tool and said workpiece in said axial direction, and
relatively displacing said tool and said workpiece in a plane perpendicular to said axial direction,
wherein said step of relatively displacing said tool and said workpiece in a plane perpendicular to said axial direction comprises relatively displacing said tool and said workpiece in accordance with desired vector magnitude data and desired vector angle data relating to a polar coordinate frame of reference, wherein said step of relatively displacing said tool and said workpiece in an axial direction comprises relatively displacing said tool and said workpiece to a first offset position, and wherein said step of relatively displacing said tool and said workpiece in a plane perpendicular to said axial direction comprises relatively displacing said tool and said workpiece from a first origin point along a first desired vector angle through a distance equal to a first desired vector magnitude, and relatively displacing said tool and said workpiece in a reverse manner so as to return to said first origin point, said method comprising the additional steps of further relatively displacing said tool and said workpiece in said axial direction to a second offset position, relatively displacing said tool and said workpiece from a second origin point along a second desired vector angle through a second desired vector magnitude, and relatively displacing said tool and said workpiece in a reverse manner so as to return to said second origin point.

14. A method for electric discharge machining utilizing a tool and a table capable of supporting a workpiece, said tool and said workpiece defining an axis having an axial direction, comprising the steps of:
relatively displacing said tool and said workpiece in said axial direction to a first position;
relatively displacing said tool and said workpiece in a first plane perpendicular to said axial direction from said first position along a desired vector angle through a distance equal to a desired vector magnitude, and relatively displacing said tool and said workpiece in a reverse manner so as to return to said first position;
relatively displacing said tool and said workpiece in said axial direction from said first position to a second position; and
relatively displacing said tool and said workpiece in a second plane perpendicular to said axial direction from said second position along a desired vector angle through a distance equal to a desired vector magnitude, and relatively displacing said tool and said workpiece in a reverse manner so as to return to said second position.

15. The method claimed in claim 14, comprising the step, prior to relatively displacing said tool and said workpiece axially from said first position to said second position, of relatively displacing said tool and said workpiece in said first plane perpendicular to the axial direction from said first position along a second desired vector angle through a distance equal to a second desired vector magnitude, and reversing the relative displacement back to the first position.

16. An apparatus for electric discharge machining utilizing a tool and a table capable of supporting a workpiece, said tool and said workpiece defining an axis having an axial direction, comprising:
means for relatively displacing said tool and said workpiece in said axial direction to a first position;
means for relatively displacing said tool and said workpiece in a plane perpendicular to said axial direction from said first position along a desired vector angle through a distance equal to a desired vector magnitude, and for relatively displacing said tool and said workpiece in a reverse manner so as to return to said first position;
means for relatively displacing said tool and said workpiece in said axial direction from said first position to a second position; and
means for relatively displacing said tool and said workpiece in a second plane perpendicular to said axial direction from said second position along a desired vector angle through a distance equal to a desired vector magnitude, and for relatively displacing said tool and said workpiece in a reverse manner so as to return to said second position.

17. The apparatus as claimed in claim 16 wherein, prior to relatively displacing said tool and said workpiece axially from said first position to said second position, said means for relatively displacing said tool and said workpiece in said plane perpendicular to said axial direction from said first position along said desired vector angle through a distance equal to said desired vector magnitude relatively displaces said tool and said workpiece in a plane perpendicular to the axial direction from said first position along a second desired vector angle through a distance equal to a second desired vector magnitude, and reverses the relative displacement back to the first position.

* * * * *